July 12, 1966 T. C. ABBOTT, JR., ET AL 3,260,153
REDUCING CAMERA
Filed March 19, 1963 4 Sheets-Sheet 1
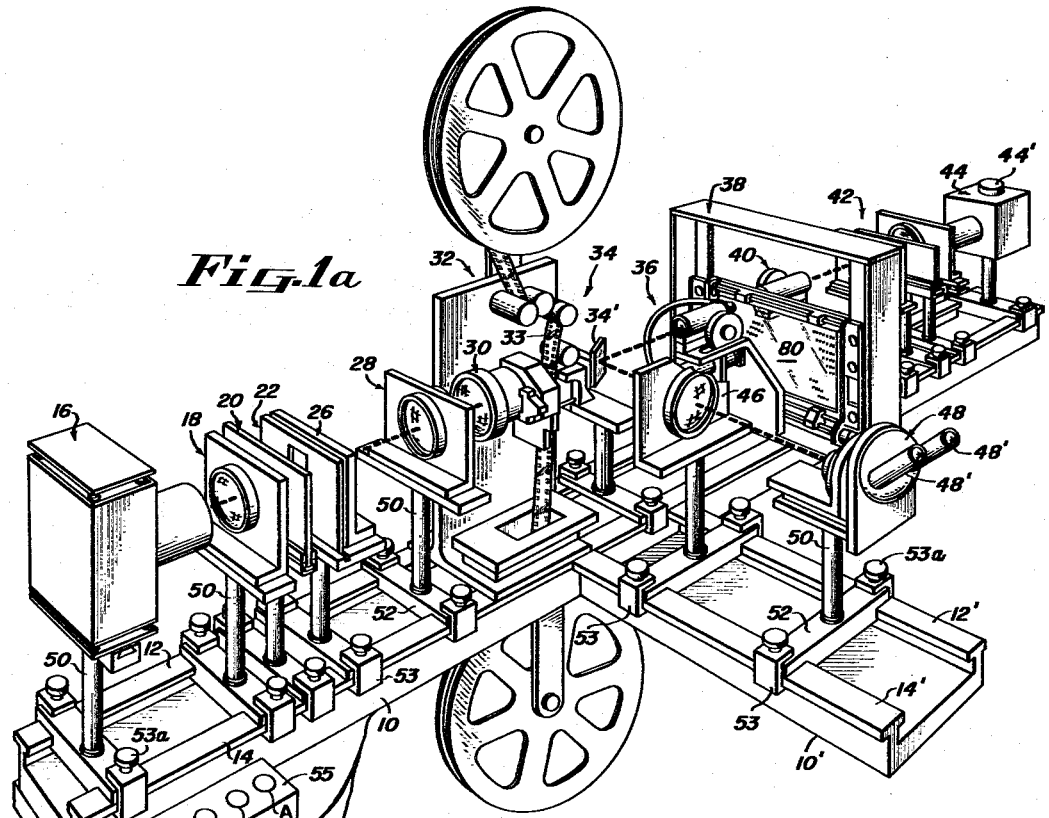
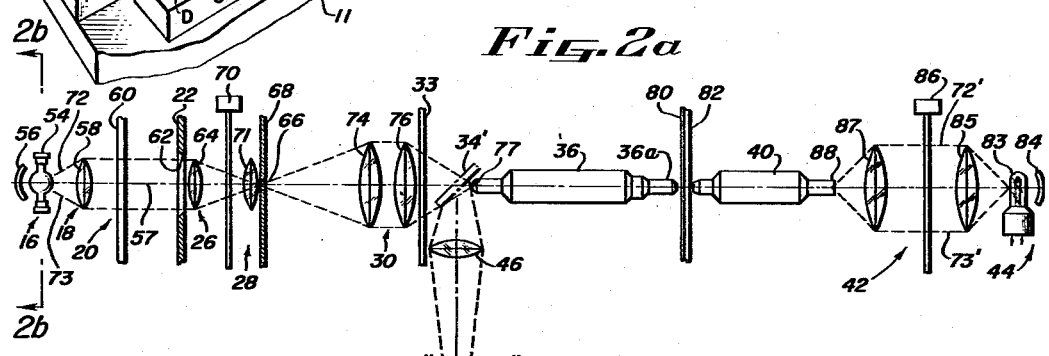
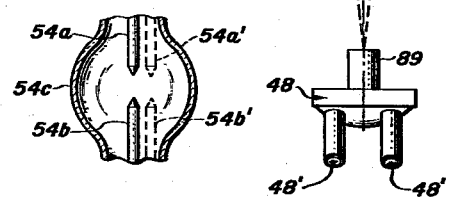
Inventors:
Tirey C. Abbott, Jr.
Carl O. Carlson
Henry D. Ives
Ivan V. Rondas
By Louis A. Kline
John T. Marlago
Dominick Nardelli
Their Attorneys.

July 12, 1966  T. C. ABBOTT, JR., ET AL  3,260,153
REDUCING CAMERA
Filed March 19, 1963  4 Sheets-Sheet 2
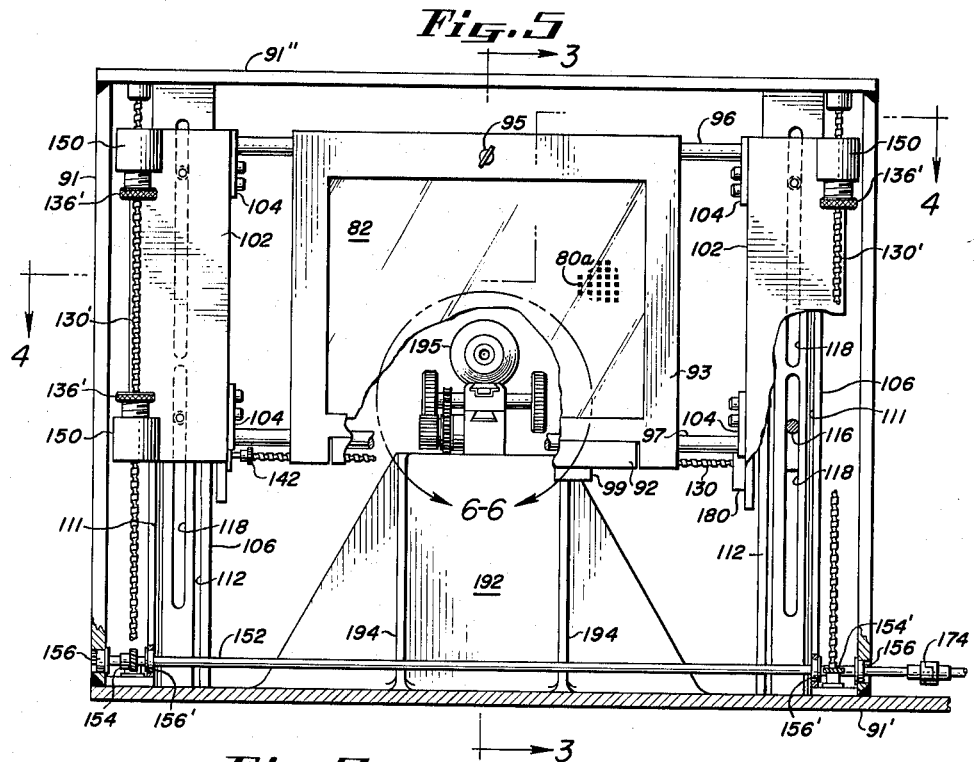
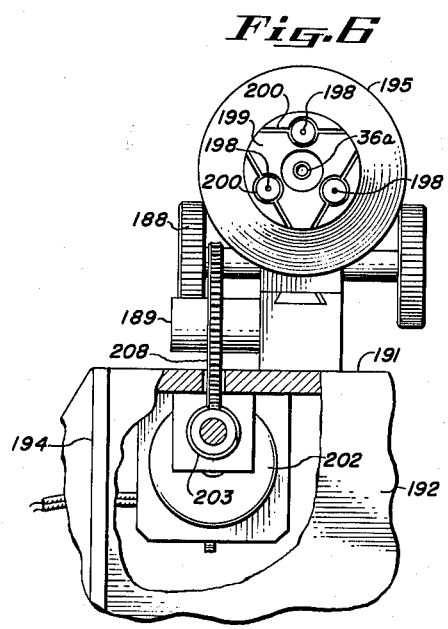
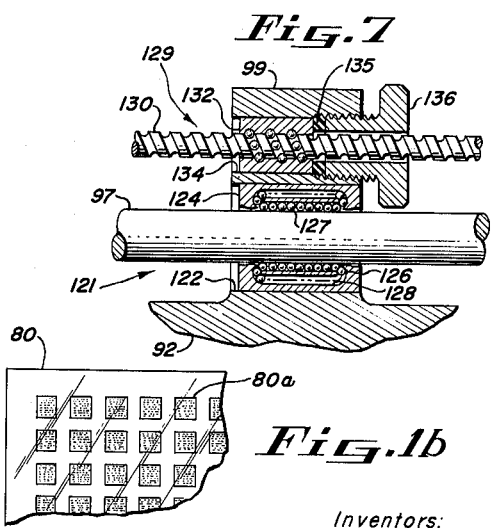
Inventors:
Tirey C. Abbott, Jr.
Carl O. Carlson
Henry D. Ives
Ivan V. Rondos
By
Their Attorneys.

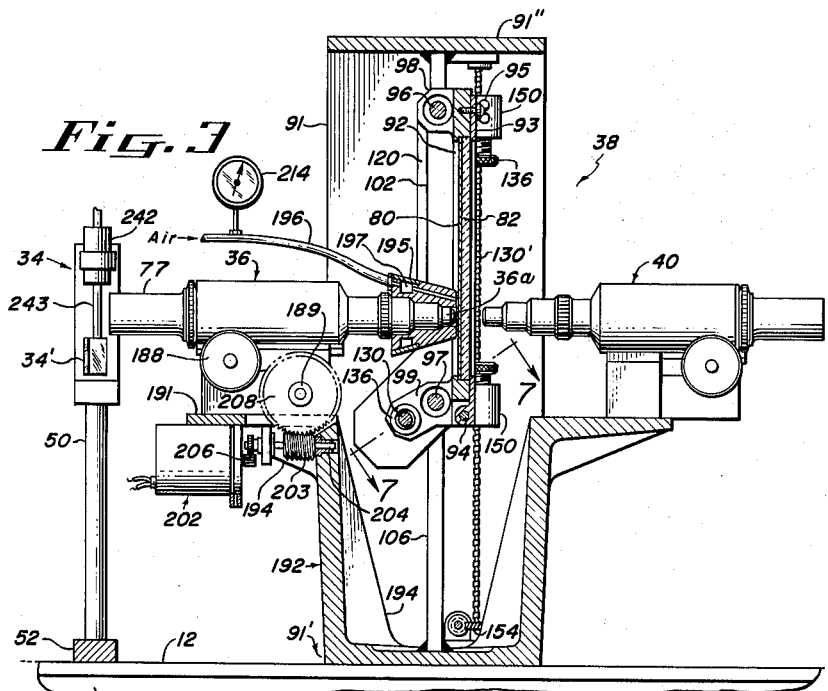
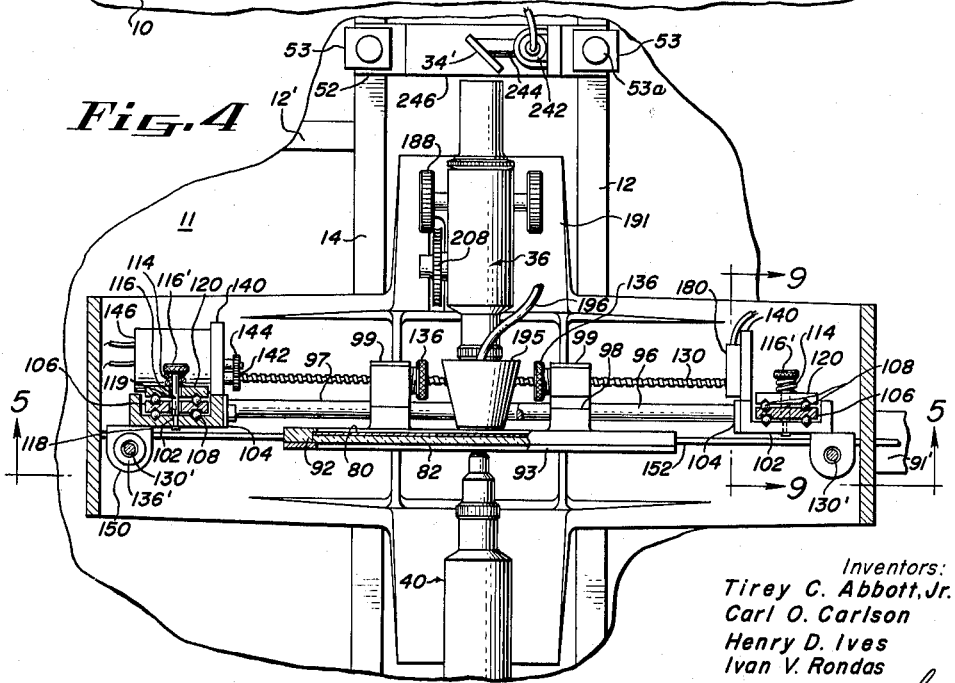

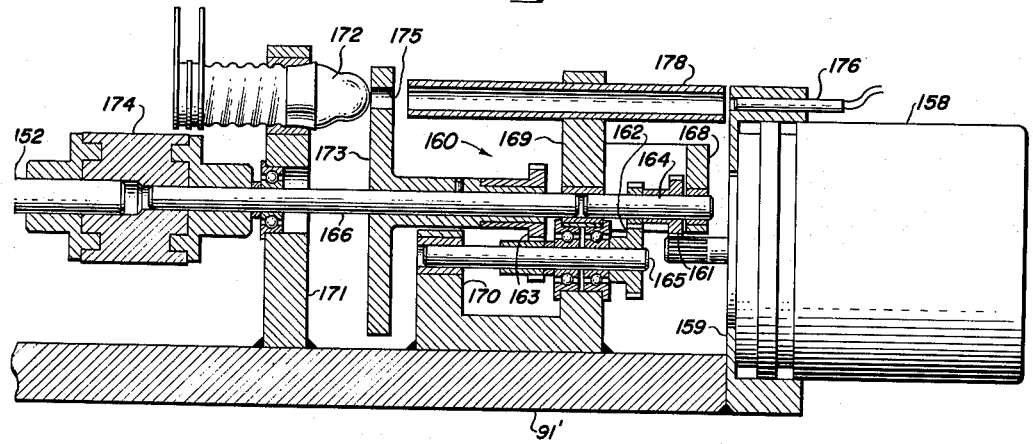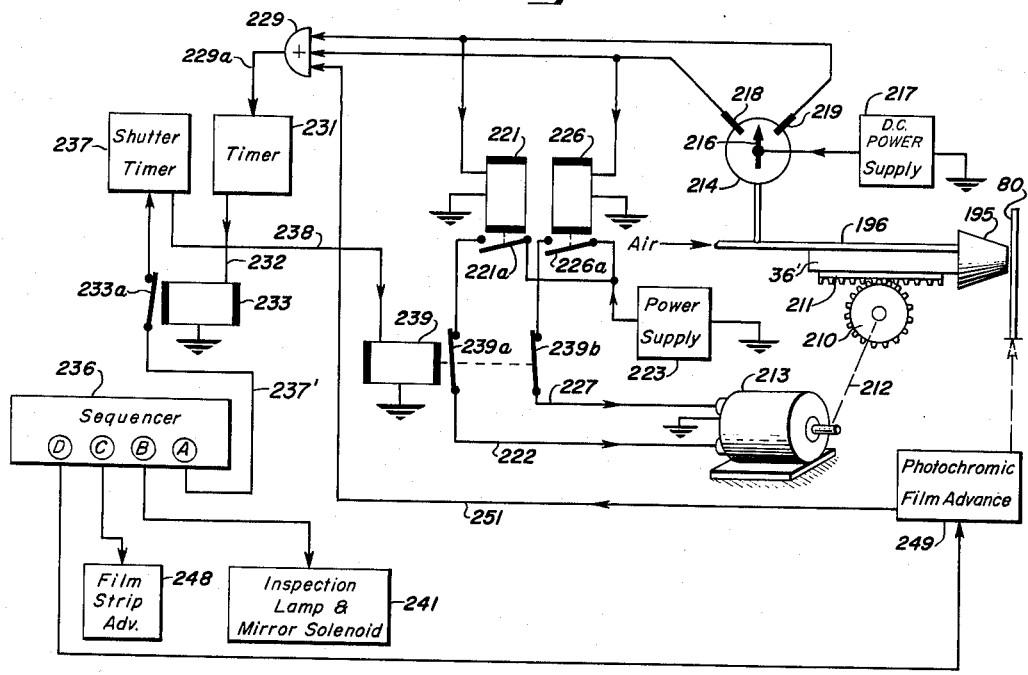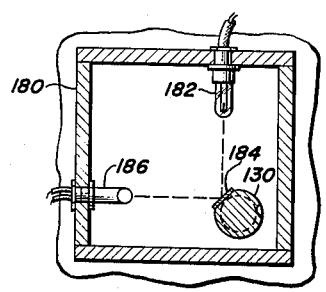

United States Patent Office 3,260,153
Patented July 12, 1966

3,260,153
REDUCING CAMERA
Tirey C. Abbott, Jr., Manhattan Beach, Carl O. Carlson, Los Angeles, Henry D. Ives, Hermosa Beach, and Ivan V. Rondas, Redondo Beach, Calif., assignors to The National Cash Register Company, Dayton, Ohio, a corporation of Maryland
Filed Mar. 19, 1963, Ser. No. 266,359
15 Claims. (Cl. 88—24)

This invention relates to reducing cameras and, more particularly, to an improved reducing camera which reduces an original record, for example a conventional letter size page, to a size of one-hundredth or less of its original size.

In general, the degree of reduction of an original record is directly related to the distance that the original record is disposed from the objective lens of the camera and is also inversely related to the focal length of the objective lens. The lens resolving power is the ability of a lens to reveal detail in an image and is related to both the diameter of the lens opening and the focal length.

It is known in the art that, to produce a reduced image with high resolution, the camera should have an optical system that includes an objective lens having a relatively large diameter lens opening and a relatively small focal length. When attempts are made to reduce an original to more than one-hundredth of its original size in any practical size system, the focal length of the lens is so short and the lens opening is so large that the resulting image has a very small depth of field or depth of focus, that is for example, about 20 millionths of an inch, or one-half of a micron (.0000005 meter). Such a shallow depth of focus introduces many problems, because, although the camera elements are rigidly supported, any disturbance, for example the weight of a man's hand, could produce sufficient deflection in the camera elements to move the image and to cause a blurred picture. Therefore, when a run of many pictures is to be formed on one record medium it usually happens that one or more pictures may be blurred because of some slight disturbance.

However, a very considerable step forward towards a practical solution to the above mentioned problem, i.e., blurred images, has already been achieved, as demonstrated by the optical storage system disclosed in a copending United States patent appliction, Serial No. 111,759, filed on May 22, 1961, now U.S. Patent No. 3,185,026. This application discloses a photometachromatic (hereinafter referred to as photochromic) material made into a photosensitive film. Briefly, photosensitive films made of photochromic materials have the inherent properties of being transparent and containing a molecular dispersion of reversible light sensitive dyes, which become opaque on exposure to radiation in the blue-ultra-violet portion of the electromagnetic spectrum. The materials are of the type wherein the opaque condition can be erased by applying a relatively high intensity radiation from the central portion of the optical spectrum. The photochromic material readily retains patterns or pictures until erased, and these patterns can be transferred permanently onto fine-grain, silver-halide films by contact printing. In addition to possessing the above-mentioned capabilities, photosensitive films made of photochromic materials do not require the formation of a latent image. Thus, the picture formed thereon can be immediately inspected, erased, and reformed, if the picture is not acceptable. These characteristics of the film are very important in a camera of the type to be described, which can reduce documents to a relatively small size and wherein proper alignment and focusing are difficult to maintain.

Evidently, the above mentioned patent applicaiton solves the problem that enables a camera to produce all clear reduced pictures on the photochromic film. This feature is an important advance towards the ideal reducing camera. However, the application does not provide the complete solution. Admittedly, the application discloses a reducing camera which is quite adequate in many applications. However, when the objective lens of the reducing camera has a depth of focus that is shallow relative to the thickness of the photosensitive film, the film is not exposed completely through. Then, if contact prints are made from the photochromic film, all the pictures in the photochromic film master may not be transferred in equal resolution to the contact print because some pictures may be embedded further into the photochromic film than other pictures are embedded. As a result the focusing problem becomes more acute when the reducing camera requires an objective lens with a depth of focus of one-half of a micron or less.

The principal object of this invention is to provide an improved, more reliable, and more economical reducing camera of a convenient size, which camera can produce pictures that are reduced by as much as 100 times or more and have a resolution of more than 600 lines per millimeter.

Another object of this invention is to provide a reducing camera with an automatic focusing system wherein the spacing, between the objective lens and film, is checked before an exposure and, if out of focus, is automatically returned to within the prescribed limit.

Another object of this invention is to provide an improved reducing camera which produces relatively high resolution pictures and which places the pictures in order and in a predetermined sequence on a photosensitive film.

Another object of this invention is to produce pictures that are formed substantially at the surface of a photochromic film with an objective lens having a relatively short depth of focus, for example, one-half of a micron, relative to the thickness of the film, for example two microns or more.

Another object of this invention is to provide an improved reducing camera wherein manual operation and operator's attention are reduced to a minimum so that the time required to complete a series of pictures is greatly reduced.

Briefly, the invention provides a reducing camera with a light source having a suitable wavelength, which camera reduces pictures that are formed on a 35 millimeter film (referred to hereinafter as microfilm) to reduced pictures having a size, for example, about 50 mils high and 40 mils wide on a photochromic film. The reduced pictures have a relatively high resolution, for example, more than 600 lines per millimeter. The photochromic film is supported by a suitable photochromic film support assembly at the focal plane of the camera's objective lens. The photochromic film is movable in two orthogonal directions so that the portion of the photochromic film which is being exposed lies always substantially in the focal plane of the objective lens. Mechanical means are provided to take up any play in both movable directions. The mechanical means eliminate any backlash therein, to cause the photochromic film to return to approximately the same place from where it has been moved, by simply retracing the operation. Therefore, the pictures are placed on the film in a discrete pattern for improved accessibilty, for example, serially from left to right in parallel rows. The mechanical means, also, take up the play and eliminate backlash therein in a third direction, orthogonal to the other two directions. Since the camera elements must remain substantially fixed, for example, have limited motion of no more than one-half of a micron, the camera's focus should be checked before an exposure is made. Although this procedure can be tediously done manually, the camera is provided with an added feature, for example, a servo-system, to maintain automatically the camera in focus. The servo-system requires very little attention and performs the function faster than a skilled operator can do manually. The servo-system responds to the air pressure in an air gauge system, which pressure is inversely related to the spacing between the film and the objective lens. However, every time the servo-motor is energized by the servo-system to bring the camera back in focus, relatively large undesirable vibrations are formed. Since an average exposure is about two seconds, there is a great possibility that the spacing between the objective lens and the film will drift during the exposure. Then, although the servo-system is provided with a feature that prevents an exposure while the servo is hunting, the servo-system has another feature that prevents the servo from hunting as an exposure is being formed. Since photochromic film is to be used in the camera, the camera is provided with another light source and an optical means that projects light at another suitable wavelength through the opposite side of the photochromic film, whereby a picture formed in the film may be inspected by the operator before, during, and after exposure. If for any reason the picture is not acceptable, the intensity of the light, by which the film is inspected, is increased to erase the picture and the picture is re-formed on the film.

Other objects, advantages, and features of the present invention will become apparent from the consideration of the following description when taken in conjunction with the appended claims and the drawings wherein:

FIG. 1a is a pictorial view of the present invention showing the relative location of the various elements of the camera in schematic form;

FIG. 1b is an enlarged view of a portion of an exposed photochromic film showing the relative position of the respective pictures formed thereon;

FIG. 2a is a schematic layout of the optical system of the camera;

FIG. 2b is an enlarged section of a part of a mercury vapor lamp taken on line 2b—2b of FIG. 2a showing, in particular, the lamp electrodes and the location of an image of the electrodes formed by the spherical mirror;

FIG. 3 is a partial sectional elevation of the camera showing, in particular, the objective lenses and the photochromic film support assembly;

FIG. 4 is a partial sectional view taken, in general, on line 4—4 of FIG. 5 in the direction of the arrows;

FIG. 5 is a partial sectional view taken, in general, on line 5—5 of FIG. 4 and in the direction of the arrows;

FIG. 6 is a broken away enlargement of the objective lens and focusing mechanism enclosed generally by circle 6—6 of FIG. 5;

FIG. 7 is a section taken on line 7—7 of FIG. 3 in the direction of the arrows and shows a typical ball bearing lead-screw assembly and a typical ball bearing bushing assembly;

FIG. 8 is a sectional view of a gear drive train for moving the film in the vertical direction;

FIG. 9 is a partial section taken on line 9—9 of FIG. 4 in the direction of the arrows; and FIG. 10 is a block diagram of the servo-system used to maintain a constant spacing between the objective lens and the photochromic film.

As used in this disclosure, the term microfilm refers to a 35 millimeter film containing picture frames of reduced records as is commonly found in the prior art. The pictures on the microfilm are, in general, reduced about one-twentieth of the original and have a resolution of about perhaps 80 lines per millimeter. Resolution of a picture or of an image is measured by the number of equivalent line pairs (a line pair consists of one black and one white line) per millimeter that are distinguishable in the picture or image. The terms image and picture have, in general, been used herein to describe the reproduction of the original as formed by the light rays at the focal plane of the objective lens or to describe a two-dimension pattern as formed in a film. Photometachromatic or photochromic materials refer to the material described in the above mentioned application, Serial No. 111,759, now U.S. Patent No. 3,185,026.

Referring to FIG. 1a, the reducing camera of the present invention is shown pictorially and the elements of the camera are shown in schematic form to simplify the view. The reducing camera comprises a rigid, heavy elongated bed or foundation 10 and a subsidiary bed 10' disposed at right angles thereto, both being made of, for example, steel. The beds 10 and 10' are supported by a suitable foundation 11 (partially shown). Bed 10 has formed, on the upper portion thereof, two parallel rails 12 and 14 which support the various camera elements. The various camera elements are positioned in the following order on the bed 10: a printing light source assembly 16, a first stage light collector lens assembly 18, a light filter assembly 20, a field mask 22, a first stage light condenser lens assembly 26, an image relay assembly 28, a second stage light collector and condenser lens assembly 30, a microfilm reel carrier assembly 32 carrying an original record preferably in the form of a 35 millimeter microfilm strip 33 containing picture frames compatible with the required picture qualities at this point in the system, a movable mirror assembly 34, a printing objective lens system 36, a photochromic film support assembly 38, an inspection illuminating objective lens system 40, an inspection optical illumination assembly 42, and a suitable inspection lamp assembly 44.

The subsidiary bed 10' has formed thereon two parallel rails 12' and 14', that are similar to rails 12 and 14 on bed 10 but disposed at right angles thereto. The following elements are positioned on rails 12' and 14': an inspection field lens 46, and a suitable eyepiece assembly 48 having a pair of oculars 48'.

The microfilm reel carrier assembly 32 and the photochromic film support assembly 38, being the largest elements, are fixed by suitable means (not shown) to the bed 10, while the other assembly elements, although they are also fixed to the bed 10, are preferably mounted so that they are able to be readily moved with respect to the reel carrier 32 and the photochromic film support assembly 38 in order to facilitate optical alignment of the camera. Each of these other assembly elements, in general, is fixed onto a post 50 and, in turn, to a crossbar 52, which bridges the rails 12 and 14 and is slidable along the rails to align the optics of the camera. Then, suitable clamps 53 with thumb screws 53a are used to secure the crossbars 52 to the rails 12 and 14.

The camera operates as follows: the light source assembly 16 directs a beam of light towards the microfilm strip 33 and is cut off by a suitable shutter 70 (more clearly shown in FIG. 2a) supported by assembly 28. The microfilm strip 33 has been advanced by suitable means (not shown) disposed on the reel carrier assembly 32 (which means are preferably a standard commercially available item) to the picture frame that is to be printed on a photochromic film 80. The photochromic film 80, in turn, is supported by film support assembly 38. The photochromic film 80 has been advanced by suitable means (to be explained hereinafter) assembled in film support assembly 38 to a particular position so that a plurality of reduced pictures 80a (more clearly shown in FIG. 1b) of the frames on the microfilm strip 33 are discretely positioned on the photochromic film.

The shutter 70 opens to expose the film 80 when, for example, a button A is pushed on panel 55 (to be described more fully hereinafter). The elements of the camera are so arranged that the light from the printing light source assembly 16 shines through only one picture frame on the microfilm strip 33 to form a reduced image in the plane of the photochromic film 80. Of course, for this operation, the movable mirror 34' on assembly 34 is positioned out of the way of the light beam.

After a picture is exposed on the photochromic film, the picture is inspected by pushing, for example, a button B on panel 55. In turn, the inspection lamp assembly 44 is energized to shine a beam of light towards the photochromic film 80 and it illuminates the picture thereon so that it can be inspected. At the same time, assembly 34 is energized to place mirror 34' in way of the light beam. The mirror 34', being a plane mirror disposed at 45° to the beam, reflects the light beam towards the inspection field lens 46 and eyepiece assembly 48. Whenever the picture on the photochromic film 80, as observed through the pair of oculars 48', appears blurred and is not acceptable, the operator reaches for and rotates a knob 44' on light source assembly 44 to increase the intensity of the light source so that the image may be erased. Knob 44' operates, for example, a suitable variable transformer (not shown) to increase the voltage supplied to the inspection lamp 83 (FIG. 2), and, in turn, to increase the intensity of light emitted therefrom. Before the operator can recheck the photochromic film 80, the light intensity should be cut back so that the bright light does not damage his eyes. The image can be reformed by again pressing button A.

To form an image of the next frame on the microfilm strip 33, for example, a button C on panel 55 is pressed. Button C energizes the suitable means in the microfilm reel carrier 32 that advances the microfilm strip 33 to the next frame. At the same time by pressing button D on panel 55, suitable mechanism (to be described hereinafter) is energized, and the photochromic film 80 advances to the next image position. An enlarged plan view of a section of the photochromic film 80 after exposure is shown in FIG. 1b, wherein the pictures 80a formed thereon are disposed, for example, in a predetermined checkerboard pattern and serially from left to right in parallel rows.

Referring to FIG. 2a, the optics of the camera, to perform the above described operation, are shown schematically. The printing lamp assembly 16 includes a lamp 54, for example, a mercury vapor lamp that produces light, preferably, in the violet and ultra-violet region and also includes a small spherical mirror 56 for projecting a light beam in one direction along an optical axis 57, and for forming an image of the lamp 54 adjacent thereto, more clearly shown in FIG. 2b. To produce this effect the axis of mirror 56 needs to be disposed at a slight angle to the optical axis 57. The mercury vapor lamp 54 (being a commercially available item) has two opposing electrodes 54a and 54b centrally enclosed within a quartz envelope 54c. Due to the inherent nature of the mercury vapor lamps, the light energy is emitted primarily from two points spaced from the tips of each electrode and disposed inbetween the two electrodes. The spherical mirror 56, being so positioned, focuses electrode images 54a' and 54b' (shown by dashed lines) of the electrodes 54a and 54b, respectively, disposed alongside thereof. Naturally, images of the two points primarily emitting light are formed between the electrode images 54a' and 54b', and a double light source is simulated to improve the resolution of the images or pictures 80a to be formed in the plane of the photochromic film 80. To form the light beam to expose the film 80, the light from lamp 54 and the light reflected by mirror 56 is collected by a first stage collector lens 58, that is mounted in assembly 18 of FIG. 1. A substantially collimated beam of light is formed which passes through the filter assembly 20 and, in particular, through a suitable light filter 60. Filter 60 passes, for example, colored light in the violet and near ultraviolet, which is the preferred spectral range for writing on photochromic film. The collimated filtered light beam next passes through a suitable aperture 62 in the field mask 22 which shapes the light source to a suitably shaped field to be imaged on the picture frame on the microfilm strip 33, as will be described hereinafter. The light, after passing through the field mask 22, passes through a first stage condenser lens 64 mounted in assembly 26, which lens 64 focuses an image of the double light source (as shown in FIG. 2b) at an aperture 66 formed in a light source mask 68 which is a part of the image relay assembly 28. The image relay assembly 28 also supports the shutter 70 and an image relay lens 71, that is mounted relatively close to aperture 66.

The two short dashed lines 72 and 73 in FIG. 2a illustrate that light rays radiating from the lamp 54 are collected by lens 58. The rays, after passing through the lens 58, are collimated. The rays then enter the lens 64 and are converged to focus an image of the double light source substantially in the plane of the aperture 66 in the light source mask 68.

The function of the light source mask 68 is to produce a sharply defined light source by masking out the darker outer fringes of the light source from the source image and by allowing only the bright light from near the center of the light source to pass through the aperture 66. The relay lens 71 is positioned near the focal plane of the lamp image so that, according to well known optical principles, the two dashed lines 72 and 73 continue as substantially straight lines through aperture 66 to the second stage collector and condenser lens assembly 30. The light rays pass through two closely spaced lenses 74 and 76 in the second stage lens assembly 30, where the rays are again collimated and then are converged. After leaving lens 76, the light rays pass through microfilm strip 33. Another image of the light source is formed at the entrance pupil 77 of the printing objective lens 36 which, in this embodiment, is a high power microscope. Thus, substantially all the available useful light from the mercury vapor lamp 54 has been collected to pass through apertures 62 and 66, through the film strip 33, and, in turn, the entrance pupil 77, so that the photochromic film 80 is efficiently exposed. In accordance with good optic principles, the microfilm strip 33 is placed close to the lens 76 where the illumination is substantially uniform. During the time film 80 is being exposed, mirror 34' (shown by a broken line) is removed from the optical axis 57.

The function of relay lens 71 is to focus an image of the field mask 22 on the plane of the microfilm strip 33, whereby, as mentioned above, the light is formed to a suitably shaped field to cause only the one picture frame to be printed on the photochromic film 80. The position of field mask 22 and the size and shape of the aperture 62 on mask 22 indicate what portion of the microfilm strip 33 is to be projected through the objective lens 36 onto the photochromic film 80 which is coated on a flat glass plate 82 to provide rigidity to the film. The film 80 and glass plate 82 are supported by the film support assembly 38 of FIG. 1. The image 80a is formed on the film 80 as described above.

The light, to project and inspect the small picture printed on the photochromic film 80, is directed to the back of the film 80 by an inspection lamp, for example, a tungsten lamp 83 that supplies substantially white light, and by a spherical mirror 84 mounted in lamp assembly 44. The light from lamp 83 and the light that is reflected by mirror 84 passes through the optical assembly 42 that includes a lens 85 to collect and collimate the light into a beam as indicated by the dashed lines 72' and 73'. The optical assembly 42 also includes a filter 86 which, for example, passes light preferably in the central visible portion of the optical spectrum. The central band is chosen because the exposed portions of many photochromic films have properties that absorb a relatively large portion of light in this band to enhance the contrast of the picture. The visible light, after passing through lens 87, converges onto pupil 88 of the inspection illumination lens system 40. According to well known optical principles, the light is reduced to a small spot by the lens 40, which spot is sufficient to illuminate the position of one picture 80a on the photochromic film 80. Lens system 40, preferably, is also a commercially available microscope. The visible light passing through the film 80 enters the pupil 36a of the printing objective lens or microscope 36 and passes therethrough. However, during inspection, the mirror 34' of the mirror assembly 34 is moved by suitable means (to be described hereinafter) into the optical axis 57 and path of the light. The mirror 34' reflects the light leaving the pupil 77 towards the inspection field lens 46 that is located in the focal plane of the objective lens 36. The function of the field lens 46 is to collect most of the light leaving the pupil 77 and to converge the light onto the lens in the entrance aperture 89 of the inspection eyepiece 48, as indicated by the dashed lines 72" and 73". The image is focused within inspection oculars 48' by the lens (not shown) disposed within the entrance aperture 89 whereby the operator can readily view the image on the film 80.

As mentioned above, during the time that the photochromic film 80 is being exposed, the photochromic film 80 and objective lens 36 must be mounted to be substantially stationary. As will be shown hereinafter, the film 80 is mounted in a rigid manner in the film support assembly 38 so that any vibrations in the film 80 are substantially dampened. The microfilm strip 33 during exposure is also prevented from vibrating, but the vibration problem in the microfilm strip is not as serious as in the photochromic film 80 because the allowable displacement, through which the microfilm strip 33 can move, is appreciably more in relation to the allowable displacement through which the photochromic film 80 can move. This relationship is direcly related to the degree of image reduction from the microfilm to the photochromic film. The permissible vibration amplitude at the image plane, during exposure between the image formed by the objective lens 36 and the film 80, is to be no more than one-eighth of a line width (a line width is one black and one while line pair) of the line resolution of the picture. As an example, if a picture with a resolution of 600 lines per millimeter is required in the photochromic film, the image plane should not vibrate with an amplitude of more than about .2 of a micron parallel to the photochromic plane before objectionable degradation of the 600 lines per millimeter resolution is noticeable. Then, because the camera is required to reduce the picture frame on the microfilm strip 33, for example, by a factor of twenty, the strip 33 may vibrate parallel to the image plane with an amplitude up to 4 microns before degradation of the 600 lines per millimeter resolution on the photochromic film is equivalent to the photochromic plane vibrating 0.2 of a micron with respect to the image. Therefore, greater precautions with respect to image photochromic film motion are necessary at the photochromic plane than at the microfilm strip plane.

Referring to FIGS. 3, 4, and 5, a preferred detailed embodiment of photochromic film support assembly 38 is shown and, in particular, the features that maintain the photochromic film 80 substantially fixed during an exposure and that allow the film 80 to advance while remaining substantially normal to the optical axis 57. Referring to FIG. 3, in particular, a cross section of the elevation of the photochromic film support assembly 38 is shown resting on the rails of the bed 10. Only rail 12 is shown, as the view is a section. The photochromic film support assembly 38 includes a rigid outer stationary support 91 which is suitably fixed to the bed 10 and supports an inner rectangular support 92 movable therein. The glass plate 82 with the coating of photochromic film 80 is secured between the inner rectangular support 92 and a rectangular securing section 93 which is rotatable downward with respect to support 92 about a hinge rod 94. The rectangular securing section 93 is secured, so as not to rotate downward relative to the inner support 92, by suitable means, for example, a thumb screw 95.

The photochromic film 80 is positioned by the photochromic film support assembly 38 to be perpendicular to the optical axis 57 (FIG. 2) and, also, is disposed to move in two orthogonal directions which are orthogonal to the optical axis 57.

Referring to FIG. 4, the inner support 92 is supported by two horizontally disposed rods 96 and 97 (more clearly shown in FIG. 5) that pass through suitable bores located in upper lugs 98 and lower lugs 99, respectively, that are, in turn, integral with the inner support 92. The inner support 92 is disposed to slide along the rods 96 and 97 and moves in the horizontal direction. The rods 96 and 97 are secured at each end to two vertical-track-riders 102 with the aid of securing blocks 104 that are suitably bolted to the track-riders 102, as shown in FIGS. 4 and 5. The vertical-track-riders 102, in turn, move vertically along the two vertical tracks 106 which are fixed between the lower portion 91' and the upper portion 91" of the outer stationary support 91. Because photochromic film is also heat erasable, the film support assembly 38 is to be enclosed, preferably in a dust-free, refrigerated chamber. Therefore, precise ball bearing means are provided between riders 102 and tracks 106. Ball bearings are used because they require no lubrication, or require very low viscosity lubricants, which have low viscosity even at refrigerated temperatures.

The ball bearing means include steel ball bearings 108 riding between suitable bearing ways formed in the vertical-track-riders 102 and the tracks 106. Suitable ball retainers (not shown) are provided to retain and space the balls 108 within the ways. To provide smooth, precise straight line motion, two V-shaped ways are formed in each vertical-track-rider 102, but one V-shaped way 111 and one flat-bottomed way 112 (more clearly shown in FIG. 5) are formed in each track 106. Slight mechanical imperfections that are inherent in the alignment of the ways on either side of the inner support 92 are taken up in the rod securing blocks 104.

The vertical-track-riders 102 are biased against the tracks 106 to prevent any play between the parts. This result is obtained by suitable compression springs 114 that are disposed around collar bolts 116 whereby the springs 114 react between the bolt head 116' and back-up-riders 120. The collar bolts 116 are threaded to the vertical-track-riders 102 and extend freely through vertically elongated slots 118 (more clearly shown in FIG. 5) formed in tracks 106 and suitable bores 119 formed in back-up-riders 120. As mentioned, the springs 114, being compressed between the heads 116' of the collar bolts 116 and the back-up-riders 120, cause both the vertical-track-riders 102 and back-up-riders 120 to bear against the tracks 106. Since the back-up-riders 120 move with the track-riders 102, ball bearing means are also provided between the tracks 106 and the back-up-riders 120 which means include more ball bearings 108 riding between two V-shaped ways in the back-up-riders 120 and one V-shaped way and one flat bottomed way in each track 106.

As shown in FIG. 1b, the pictures 80a are disposed in a checkerboard pattern on the film 80. Therefore, the inner support 92 is also disposed to move in the horizontal direction as well as in the vertical direction. Ball bearings are also used to provide smooth and stepless motion in the horizontal direction. Referring to FIG. 7, a specific embodiment is shown employing ball bearings for the horizontal motion. A section through one of the lower lugs 99 including a typical ball bearing bushing assembly 121 is shown. One rod 97, of the horizontally disposed rods which support the inner support 92, protrudes through a bore 122 formed in lug 99. A bushing 124 is disposed within the bore 122 and retains a plurality of ball bearings 126. The ball bearings 126 roll between the rod 97 and suitable ball bearing ways 127 in the bushing 124. The rod 97 having a ground smooth finish needs no special ways formed therein. The well known principle of the recirculating ball bearing is incorporated herein, whereby the bushing 124 picks up the ball bearings 126 leaving the ways 127, as the bushing 124 moves along the rod 97, and recirculates the balls 126 through suitable bores 128 formed therein to the other end of the bushing 124. Ball bearing bushing assemblies that are similar to the ball bearing bushing assembly 121 are also provided between the other lower lug 99 and the rod 97 and between each upper lug 98 and rod 96. The ball bearing bushing assembly 121 is a commercially available item.

In FIG. 7, there is also shown a ball bearing lead-screw assembly 129 comprising a horizontally disposed lead-screw 130 engaging a ball bearing nut 132. The function of the lead-screw assembly 129 is to translate rotational motion to linear motion. Ball bearing nut 132 is suitably disposed within another bore 134 formed in lug 99. Only one locking nut 136 per assembly is used to retain the ball bearing nut 132 within the bore because the assemblies 129 are always used in pairs and oppose each other. Between the ball bearing nut 132 and the locking nut 136 is a pressure pad 135 made of, for example, rubber. Then since the lead-screw assemblies 129 are used in pairs on one lead-screw 130, backlash is taken up by the compression pad 135 by rotating the nut 136 into the bore 134 so that each lead-screw assembly 129 reacts against the other. The well known principle of the recirculating ball bearing is also incorporated in the ball bearing lead-screw assembly 129 (ball recirculation path not shown). When the lead-screw 130 rotates, the bearing nuts 132 of both assemblies 129 move together axially along the screw 130 and, in turn, cause the inner support 92 to move along the rods 96 and 97. The ball bearing lead-screw assembly 129 is also a commercially available item.

Referring again to FIG. 4, the horizontally disposed lead-screw 130 is shown suitably bearing supported at each end to a flange 140 formed on each vertical-track-rider 102. A gear 142 is mounted on and near one end of lead-screws 130 and engages a pinion 144 that is mounted on the armature of an electric motor 146. Motor 146, in turn, is suitably mounted on the flange 140 of one of the vertical-track-riders 102 and rides up and down therewith. Horizontal motion is translated to the inner support 92 by energizing motor 146 to cause the horizontally disposed lead-screw 130 to rotate. The inner support 92 moves either to the right or to the left, depending on the direction of rotation of the lead-screw 130. When the lead-screw 130 stops, the support 92 is locked in place since, as mentioned above, there is no backlash between the pair of ball bearing assemblies 129 enclosed in lugs 99 and the lead-screw 130.

The two orthogonal directions, in which the inner support 92 moves, are defined in the vertical direction by the V-shaped way 111 (FIG. 5) in each of the vertical tracks 106 and in the horizontal direction by the rods 96 and 97. The V-shaped ways 111 are formed in each track 106 by precision machining and are machined parallel to each other. Any play and wear between the moving parts in the vertical direction, is taken up by the combination of ball bearings 108 and the compression spring 114 pressing each vertical-track-rider 102 and back-up-rider 120 against each track 106, respectively. The rods 96 and 97 are fixed to the vertical-track-riders 102, and are disposed parallel to each other and normal to the ways 111 in tracks 106. Any play herein is removed by slightly bowing the rods 96 and 97, for example, by making the spacing between the rods 96 and 97 at the lugs 98 and 99 different from the spacing between the rods 96 and 97 at the securing blocks 104.

Referring to FIG. 5, in order to ensure that the rods 96 and 97 are always perpendicular to the ways 111, the two vertical-track-riders 102 are moved vertically in unison by two vertically disposed ball bearing lead-screws 130', which are similar to the horizontally disposed lead-screw 130 that actuates the support 92 horizontally.

The two vertically disposed lead-screws 130' engage ball bearing nuts which are similar to the previously mentioned ball bearing nut 132 (FIG. 7) and which are enclosed within lugs 150 formed on both vertical-track-riders 102. These ball bearings nuts are also retained by locking nuts 136' and are used in pairs to eliminate any backlash. The vertically disposed lead-screws 130' are suitably bearing supported at their ends to the lower portion 91' and to the upper portion 91" of the outer support 91 so that both the lead-screws 130' rotate with respect to the outer support 91. The rotational speeds of the vertical lead-screws 130' are synchronized to each other by a horizontal drive shaft 152 that engages both lead-screws through hypoid gears 154 and 154'. The drive shaft 152 is supported by the side portions of the outer support 91 through suitable bearings 156. For rigidity, additional bearing supports 156' are placed near to and on the opposite side of the hypoid gears 154. For clarity of illustration, the lower portion of the vertically disposed lead-screw 130' on the left of FIG. 5 is shown broken away to illustrate one of the typical hypoid gears 154 that is fixed to both ends of the drive shaft 152. Each hypoid gear 154 disposed at the respective end of the drive shaft 152 engages a hypoid gear 154' mounted on the respective lead-screw 130'. Also, the middle portion of the vertically disposed lead-screw 130' and a portion of the vertical-track-rider 102 (on the right of FIG. 5) are shown broken away.

Referring to FIG. 8, the drive shaft 152 is rotated by a suitable electric motor 158 through a gear train 160. The electric motor 158 is mounted on a flange 159 that, in turn, is secured on the bottom portion 91' of the outer support 91. The gear train 160, in this embodiment, is a ten-to-one speed reducer and has three pairs of reducing gears 161, 162, and 163 that are suitably mounted on the armature of the motor 158 and on shafts 164, 165, and 166. The shafts 164, 165 and 166 are bearing supported on flanges 168, 169, 170 and 171 which, in turn, are secured on the bottom portion 91' of the outer support 91. Since the images 80a are to be formed on the photochromic film in a discrete checkerboard pattern (shown also in FIG. 5), the inner support 92 is made to move vertically equal increments and stops always in the same places. To accomplish this result, a lamp 172 is mounted on flange 171 to direct a beam of light towards a disc 173. The disc 173 is mounted on shaft 166 and rotates therewith, and shaft 166, in turn, is coupled directly to drive shaft 152 through a coupler 174. The disc 173 has a single aperature 175 that is positioned with respect to the lamp 172 to allow the beam of light to pass therethrough only when the disc 173 is at a given angular position. The light, passing through the aperture 175, is detected by a photodiode 176 mounted on flange 159. A light guide tube 178 is provided between the disc and photodiode 175 to shield the photodiode from extraneous light. Then, whenever aperture 175 is aligned with the lamp 172 and photodiode 176, the photodiode 176 produces a signal which is relayed by circuitry (not shown) to stop the motor 158. Since the motor 158 is stopped by the photodiode only when the disc 173 and, in turn, the shaft 166 are at a given angular position, the inner support 92 stops at discrete vertical positions. The spacing between these positions is determined by the pitch on the vertically disposed lead-screws 130' and speed ratio of the hypoid gears 154 and 154'.

Also to improve accessibility, the inner support 92 is made to move horizontally equal increments and stops always in the same places. The embodiment just described by which the inner support 92 is moved equal increments in the vertical direction can be incorporated to provide the same function in the horizontal direction. However, referring to FIG. 9, another method of accomplishing the same result is shown. Within an enclosure 180 (FIG. 4), that is disposed at one end of the horizontally disposed lead-screw 130 and fixed to flange 140 of one of the vertical-track-riders 102, is a suitable lamp 182 mounted to direct a light beam towards the horizontal lead-screw 130. On the lead-screw is disposed a small flat mirror which is, for example, a flat polished surface 184 formed on the lead-screw 130. When the lead-screw 130 is at a particular angular position the light beam from lamp 182 is reflected by the mirror surface 184 into a photodiode 186. When light is received by the photodiode 186, a signal is produced, that is sensed by suitable circuitry (not shown) to stop the motor 146.

Although the film support assembly 38 incorporates features for providing motion to the photochromic film 80 substantially within a plane normal to the optical axis 57, the film 80 does inherently move slightly out of this plane. This undesirable motion, although small, is relatively large in comparison to a depth of focus of one-half a micron. Such motion may be due to inherent fabrication tolerances, normal thermal expansion and contraction of parts, and other unknown factors. Although thermal expansion and contractions of parts may be compensated one against the other, the fabrication tolerances and other unknown factors are noticeable every time the film 80 advances after a picture 80a is formed. As an example, due to fabrication tolerances alone, whenever the film 80 advances a total of five inches, the spacing between the film 80 and the microscope 36 can change as much as twenty-five microns. If the film 80 is made sufficiently thick, i.e., 25 microns or more, the film 80 will always lie in the focal plane of the objective lens 36 even though the film advances either vertically or horizontally. However, since the objective lens, in the preferred embodiment of the invention, has a depth of focus of about one-half of a micron, the images formed in the thick film 80 will not always be formed near the surface. As mentioned above, to produce contact prints having acceptable resolution, the pictures should be placed on one surface of the film 80 so that the exposed portion of the film is adjacent the contact print. A visual inspection would not reveal if a picture is not formed on the surface because the optics can focus onto a picture imbedded within the transparent film. In order that a picture that appears to have the required resolution when inspected may produce acceptable contact prints, the thickness of film 80 should be about the same as or less than the depth of focus of the objective lens. However, the thinnest photochromic film that has been produced up to now has a thickness relatively greater than the depth of focus. Therefore, the camera is provided with a means for automatically focusing the camera to ensure that the images are being printed near the surface of the photochromic films. The inspection operation of the image 80a on the photochromic film 80 is used primarily to detect a poor image when caused by other causes besides improper focusing, for example, vibration disturbance of the elements.

Referring again to FIG. 4, the features that are included in the means for automatically focusing the camera will now be described. As mentioned, the objective lens 36 in this embodiment is, preferably, a microscope having a numerical aperture, for example, .32 in air meaning that the depth of focus is small, about one-half a micron. The microscope 36, being a standard commercially available item, has a coarse adjustment nut 188 and a fine adjustment nut 189. In this embodiment, the microscope is removed from its standard mount and is suitably mounted horizontally on a platform 191. The platform 191 is disposed horizontally and protrudes from a vertical support wall 192 that is cast integral with the bottom portion 91' of the outer stationary support 91. Suitable stiffening ribs 194 are provided to make the structure rigid and to steady and maintain the optical axis of the microscope 36 horizontal or, more specifically, perpendicular to the photochromic film 80 so that the focal plane of the microscope is parallel to the photochromic film 80. As mentioned above, the depth of focus is small, and a very slight cant in the axis of the microscope can cause part of the image of the film 80 to be out of focus or blurred.

Since the photochromic film 80, as it advances, moves relative to the microscope 36, the microscope is made to move accordingly to maintain a substantially constant spacing between the two. An air gauge means, that is very sensitive to very small displacements, is incorporated to detect very small changes in the spacing between the pupil 36a of microscope 36 and film 80. In this embodiment the air gauge means includes an annular hood 195 mounted on the pupil 36a of the microscope 36 near the film 80. Air, at a steady rate, is supplied to the hood 195 through an air line 196 and the air pressure is measured by a suitable pressure gauge 214. The air circulates through suitable ducts 197 formed within the hood 195 to be jetted against the film 80 through suitable nozzles, for example, three nozzles 198 (FIG. 6). Three nozzles have the advantage over a single nozzle that has to be spaced from the pupil 36a, in that the air pressure indicates the average spacing between the three nozzles 198 disposed around the pupil 36a and the photochromic film 80. The nozzles 198, being disposed around the microscope 36, are formed in a flat surface 199 that, in turn, is disposed substantially parallel to the film 80. Suitable grooves 200 are formed in surface 199 to control the air flow passage. Then, according to well known principles, when the spacing between surface 199 and film 80 is reduced slightly the air pressure in air line 196 increases appreciably, and conversely, when the spacing is increased the air pressure in air line 196 decreases. The air pressure in the air line 196 can be controlled manually by manipulating the fine adjustment nut 189 and, in turn, indicate when the camera is in focus but this is a time consuming operation.

To reduce the time required to complete a run of pictures, for example, 2500 pictures, on the film 80, a servo-system (shown schematically in FIG. 10), that responds to the air pressure, is provided to move the microscope 36 towards or away from the film 80 or along the optical axis 57. The servo-system is used to energize in the proper direction, an electric motor 202 (FIG. 3) mounted below the platform 191. The motor 202, in turn, rotates a wormgear 203 mounted on a shaft 204 through a gear and pinion speed reducer assembly 206. Suitable bearings for shaft 204 are provided on each side of the wormgear 203. The wormgear 203 engages a gear 208 fixed coaxially to the fine adjustment nut 189 so that the two are rotated in unison.

Referring to FIG. 10 wherein a schematic diagram of the servo-system is shown, the pertinent camera elements in the figure are shown diagrammatically, for example, block outline 36' being representative of the microscope 36. A gear 210 and rack 211 represent the fine adjustment mechanism of the microscope. The dashed line 212 between the gear 210 and a servo-motor outline 213 represents the mechanical drive between motor 202 and gear 208 (FIG. 3) while the servo-motor outline 213 represents the motor 202. The hood 195 and air line 196 are shown mounted on block 36'. The air gauge 214, being for example, a Bourdon gauge, indicates the pressure in the air line 196 and acts as a transducer that feeds current to the servo-motor 213. Any Bourdon gauge can be readily converted to an electrical transducer by one skilled in the art. For clarity of explanation, the gauge 214 is shown with a pointer 216 that responds to the air pressure and is electrically connected to one of the terminals of a power supply, preferably the positive terminal of a direct current power supply 217. Two spaced terminals 218 and 219 are shown mounted on the gauge 214, whereby they make contact with the pointer 216. Suitable electrical insulation (not shown) is provided between the body of the gauge 214 and terminals 218 and 219. Insulation is also provided between the pointer 216 and the body of the gauge 214.

The servo-system operates as follows: whenever the air pressure in line 196 increases, pointer 216 rotates clockwise. If the increase in pressure is relatively large, pointer 216 contacts terminal 219 to close a circuit energizing a relay 221. The relay, in turn, closes normally open contacts 221a. When contacts 221a close, a circuit is completed through a lead 222 between a suitable power supply 223 and the servo-motor 213. As a result, the motor will rotate in a direction to withdraw the microscope from the photochromic film 80, decreasing the pressure in the air line 196. If the increase in pressure is relatively high, the servo-motor is energized a relatively long time, whereby the microscope receives a relatively large momentum. Motor 213 is energized to rotate until pointer 216 breaks contact with terminal 219 to open contacts 221a. If the momentum of the microscope is sufficiently large, inertia will cause the air pressure to decrease until pointer 216 contacts terminal 218. When pointer 216 makes contact with terminal 218, relay 226 is energized to close normally open contacts 226a. When contacts 226a close, a circuit is completed through a lead 227 between the power supply 223 and motor 213, and motor 213 is energized to rotate in an opposite direction, than when pointer 216 had made contact with terminal 219, moving the microscope 36 closer to film 80 increases the pressure in the air line 196. Again, the motor 213 is energiezd to rotate until pointer 216 breaks contact with terminal 218 to open contacts 226a. During this half-cycle time portion, the microscope has not received as much momentum from the motor as during the previous half-cycle. However, the momentum may still be sufficient to cause pointer 216 to again contact terminal 219 and the servo-system is recycled. However, after a number of cycles the pointer 216 will come to rest between the two terminals 218 and 219.

The number of cycles required before the pointer 216 comes to rest is a variable quantity, being at times as low as one or two cycles and at times as high as twenty or more cycles depending on initial conditions, for example, how much the film 80 drifted from the focal plane and how far the film 80 is to advance to the next picture position. The exact number of cycles required, before the servo-system settles down after each advance of the film 80, is difficult to predetermine. Also, since the total motion through which the servo-system moves the objective lens 36 is small, the operator cannot visually observe when the system has settled down and stopped cycling. Therefore, a safety feature is provided to prevent an exposure of film 80 while the servo-system is cycling or hunting for a focus position. A safety feature with a fixed time delay would defeat the object of the invention, because the fixed time delay would have to consider the maximum allowable time needed for the servo-system to stop hunting. This maximum allowable time would then elapse between every exposure, whether needed or not. The safety feature, as provided in this invention, determines when to allow more hunting time to the servo-system. This is accomplished by coupling each terminal 218 and 219 to two inputs of an OR gate 229 which in this embodiment has three inputs. OR gate 229 is preferably of the type wherein when any one of the inputs are at a positive potential, the output 229a of the OR gate is also positive, and, when all of the inputs are at ground potential, the output 229a is at ground potential. Output 229a is coupled to a timer 231 having two functions. One of the functions is to apply a positive potential on lead 232 whenever output 229a is at a positive potential. The other function of the timer is to maintain a positive potential on lead 232 for a predetermined time, for example, two seconds, after the positive potential is removed from output lead 229a. Whenever lead 232 is at a positive potential, relay 233 is energized. Relay 233, in turn, opens normally closed contacts 233a to open the circuit between a sequencer 236 and a shutter timer circuit 237 and to prevent operation of the camera shutter 70. In summary, when pointer 216 has made contact with terminal 219, contacts 233a are immediately opened. When pointer 216 breaks contact with terminal 219, timer 231 maintains contacts 233a open for a predetermined longer period. If pointer 216 makes contact with terminal 218 before timer 231 releases the relay 233, the contacts 233a remain open, and, if on the other hand the predetermined time has elapsed before pointer 216 makes contact with terminal 218, the timer releases the relay 233 to close the contacts 233a. At this time only, the shutter 70 may be open to form an image on film 80 since the circuit between sequencer 236 and the shuter timer 237 is complete. If pointer 216 again happens to make contact with one of the terminals 218 or 219, OR gate 229 passes the positive potential to the timer 231 and immediately opens the contacts 233a. However, this event does not affect the shutter timer circuit 237 and the shutter remains open. As will be explained hereinafter, the camera has a feature that prevents motor 213 from rotating when an exposure is being made because undesirable vibrations are formed every time the servo-motor 213 is energized.

The sequencer 236 is preferably an automated embodiment of the panel 55 shown in FIG. 1 and also retains the manual features of the panel 55. The sequencer 236, through suitable circuitry and timing networks (not shown), can automatically perform an exposure, an inspection, an advance of the microfilm strip 33 and an advance of the photochromic film 80. The sequencer 236 can also be operated manually, as the push buttons A, B, C and D are incorporated therein. The sequencer also has four terminals A, B, C, and D that are associated with push buttons A, B, C and D. The contacts 233a are placed within a lead 237' that connects terminal A of sequencer 236 to the shutter timer 237. When the contacts 233a are closed the sequencer is able to pass a signal through terminal A and lead 237' to start the shutter timer 237. Also, by manually pushing the button A, a signal is able to pass through lead 237' to start the shutter timer when contacts 233a are closed. The shutter timer 237 opens the shutter 70 and an exposure of the photochromic film is made. Since the printing of the photochromic film 80 takes, for example, two seconds, the servo-system has to be prevented from moving the objective lens 35. This is accomplished by the shutter timer circuit 237 as it is of the type that provides a positive potential to lead 238, whenever the shutter 70 is open, to energize relay 239. When relay 239 is energized, normally closed contacts 239a and 239b are opened to open leads 222 and 227, respectively. With both leads open no current can be coupled to the servo-motor 213 from power supply 223. The shutter timer 237 is a standard commercially available timer as used in the photographic art.

After the time required for an exposure has lapsed, the sequencer 236 automatically feeds a signal through terminal B to a circuit 241 that energizes the inspection lamp 83 and a solenoid 242 (FIG. 3). This signal can also be produced by manually pushing button B. Solenoid 242, on being energized, pulls up an armature 243. In turn, the mirror 34' is pulled up into the optical axis 57. The mirror 34' is connected to the armature 243 by a horizontally disposed connecting bar 244 (FIG. 4) so that, when the mirror 34' drops out of the way, no opaque object is obstructing the optical axis 57. The solenoid 242 is suitably supported on the vertical arm of an angle bracket 246 that has its horizontal arm fixed to the top of one of the posts 50. As when the camera is operated manually, if the image is not acceptable, the operator reaches out to again turn knob 44' (FIG. 1) to erase the image and, at the same time, interrupts automatic operation of the sequencer 236.

After the image is inspected and the resolution is found acceptable, the operator pushes button C to provide a signal to terminal C that actuates a circuit 248 to advance the film strip 33 to the next frame. At the same time, the operator pushes button D to provide a signal to terminal D to actuate a circuit 249 to advance the photochromic film 80 to the next image position. The circuit 249 supplies current to energize motor 146 (FIG. 4) and motor 158 as required. Since the time required to advance the photochromic film 80 from one frame to the next is a variable quantity, the sequencer has to be prevented from making an exposure until the film 80 stops advancing. Therefore, when circuit 249 is advancing the photochromic film 80, a positive potential is placed on a lead 251. Lead 251, in turn, is coupled to the third input of OR gate 229. The positive potential passes through the OR gate to the timer 231, and the contacts 233a, in turn, are open to prevent the exposure of the film 80.

The embodiment of the camera as described herein refers to projecting and forming very high resolution images on reversible photochromic film. However, light sensitive films that do not have reversible properties can be used in the camera as the camera incorporates features that improve the focusing and resolution of the images even though the inspection operation cannot be performed on the film.

Various other modifications and variations of the present invention are contemplated and will become apparent to those skilled in the art without departing from the spirit and scope of the invention. Therefore, the invention is not limited to the exemplary apparatus or procedures described, but includes all embodiments within the scope of the claims.

What is claimed is:

1. A reducing camera for forming micro-images on a transparent photochromic film, said camera comprising: a longitudinal bed; first means for supporting an original record on said bed; a first optical reducing system having a light source of a first wavelength band and an objective lens mounted on one end of said bed for projecting a reduced image of said original record at a focal plane; a transparent photochromic film disposed at said focal plane; support means mounted on said bed for supporting said photochromic film at said focal plane; second means mounted on said objective lens for jetting a stream of air at a steady rate at said photochromic film and for forming an air pressure in the supply means of said air which pressure is inversely related to spacing between said objective lens and said photochromic film; a servo-system responsive to the pressure of said air of said second means to maintain a substantially constant spacing between said objective lens and said film, said constant spacing being chosen of a length such that a properly focused reduced image of said original record is formed on said film; a second optical reducing system having a light source of a second wavelength band mounted on the other end of said bed opposite from said one end for projecting a light spot onto said film to permit inspection thereof and to permit erasure of said reduced image thereon; and inspection means for intercepting the light of said second wavelength band transmitted through said film, whereby the image formed on said film is visible and is able to be inspected.

2. A reducing camera comprising: a bed; first means for supporting an original record on said bed; a first optical reducing system having a light source of a first wavelength bandwidth mounted on said bed for producing a light beam along an optical axis to project a reduced image of said original record at a focal plane; a transparent photochromic film disposed at said focal plane; a film support assembly mounted on said bed for supporting said photochromic film at said focal plane and for moving said film in two orthogonal directions, said support assembly including an inner movable support for supporting said film perpendicular to said optical axis, first guide means disposed on opposite sides of and slidably engaging said movable support for providing motion to said movable support along one of said orthogonal directions with respect to said bed, second guide means disposed on opposite sides of and slidably engaging said first guide means for providing motion to said movable support along the other of said orthogonal directions with respect to said bed, and ball bearing means disposed between said movable support and said first guide means and between said first guide means and said second guide means for providing smooth, stepless rolling contact therebetween; and a second optical reducing system having a light source of a second wavelength bandwidth mounted on said bed for projecting a light spot onto said film for erasing said reduced image and to permit inspection of said film.

3. A reducing camera comprising: a bed; first means for supporting an original record on said bed; a first optical reducing system having a light source mounted on said bed for producing a light beam along an optical axis and having an objective lens for forming a reduced image of said original record at a focal plane; a light sensitive film disposed at said focal plane and coated on a flat, rigid, transparent plate; a film support assembly mounted on said bed for supporting said flat, rigid, transparent plate with said film disposed normal to said optical axis, said support assembly including a movable support to which said transparent plate is fixed, and means for moving said transparent plate in a direction normal to said optical axis while maintaining said film normal to said optical axis, said objective lens being disposed to move relative to said film in a direction along said optical axis; air gauge means mounted on said objective lens for jetting a stream of air at a steady rate at said film and for forming an air pressure in the supply means of said air which pressure is inversely related to the spacing between said objective lens and said film; a servo-system means responsive to the pressure of said air of said air gauge means for moving said objective lens with respect to said film to maintain a substantially constant spacing between said objective lens and said film, said constant spacing being chosen of a length such that a properly focused reduced image is in focus on said film; and logic circuit means for determining when said servo-system is moving said objective lense to prevent exposure of said film while said objective lens is being moved.

4. A reducing camera comprising: a bed; first means for supporting an original record on said bed; a first optical reducing system having a light source mounted on said bed for producing a light beam along an optical axis to project a reduced image of said original record at a focal plane; a light sensitive film disposed at said focal plane; and a film support assembly mounted on said bed for supporting said film at said focal plane and for moving said film in two orthogonal directions, said support assembly including a movable support for supporting said film perpendicular to said optical axis, first guide means disposed on opposite sides of and slidably engaging said movable support for providing motion to said movable support along one of said orthogonal directions with respect to said bed, second guide means disposed on opposite sides of and slidably engaging said first guide means for providing motion to said movable support along the other of said orthogonal directions with respect to said bed, and ball bearing means disposed between said movable support and said first guide means and between said first guide means and said second guide means for providing rolling contact therebetween, said ball bearing means including spring means for preloading at least the rolling contacts disposed on opposite sides of said movable support and formed between said first guide means and said second guide means to take up any play and wear that may be formed therebetween.

5. A reducing camera for forming micro-images on a transparent film, said camera comprising: a bed; first means for supporting an original record on said bed; a first optical reducing system having a light source and an objective lens mounted on said bed for projecting a reduced image of said original record at a focal plane; a transparent film disposed at said focal plane; film support means mounted on said bed for supporting said film at said focal plane; second means mounted on said objective lens for jetting a stream of air at a steady rate at said film and for forming an air pressure which is inversely related to spacing between said objective lens and said film; a servo-system responsive to the pressure of said air of said second means for maintaining a substantially constant spacing between said objective lens and said film, said constant spacing being chosen of a length such that a properly focused reduced image of said original record is formed on said film; and logic circuit means for determining when said servo-system has established said constant spacing to inhibit the operation of said servo-system while said film is being exposed to said image projected by said first optical reducing system.

6. A reducing camera for forming micro-images on a transparent film, said camera comprising: a bed; first means for supporting an original record on said bed; a first optical reducing system having a light source, a shutter, and an objective lens mounted on said bed for projecting a reduced image of said original record at a focal plane; a transparent film disposed at said focal plane; film support means mounted on said bed for supporting said film at said focal plane; second means mounted on said objective lens for jetting a stream of air at a steady rate at said film and for forming an air pressure in the supply means of said air which pressure is inversely related to spacing between said objective lens and said film; and a servo-system responsive to the pressure of said air of said second means for maintaining a substantially constant spacing between said objective lens and said film, said constant spacing being chosen of a length such that a properly focused reduced image of said original record is formed on said film, said servo-system comprising third means for sensing when the pressure of said air of said second means is out of the tolerance limits, fourth means responsive to said third means for changing the spacing between said objective lens and said film, fifth means responsive to said fourth means for preventing said shutter from opening and exposing said film while said fourth means is changing the spacing between said objective lens and said film, and sixth means responsive to said shutter for preventing said fourth means from changing the spacing between said objective lens and said film when said shutter is open.

7. A reducing camera for forming micro-images on a transparent photochromic film, said camera comprising: a longitudinal bed; first means for supporting an original record on said bed; a first optical reducing system having a light source of a first wavelength bandwidth, a shutter, and an objective lens mounted on one end of said bed for projecting a reduced image of said original record at a focal plane; a transparent photochromic film disposed at said focal plane; film support means mounted on said bed for supporting said photochromic film at said focal plane; second means mounted on said objective lens for jetting a stream of air at a steady rate at said photochromic film and for forming an air pressure in the supply means of said air which pressure is inversely related to the spacing between said objective lens and said photochromic film; a servo-system responsive to the pressure of said air of said second means for moving said objective lens with respect to said photochromic film to maintain a substantially constant spacing between said objective lens and said film, said constant spacing being chosen of a length such that a properly focused reduced image of said original record is formed on said film; a second optical reducing system having a light source of a second wavelength band mounted on the other end of said bed opposite from said one end for projecting a light spot onto said film to permit inspection thereof and to permit erasure of said reduced image thereon; and inspection means for intercepting the light of said second band transmitted through said film by said reduced image, whereby the image formed on said film is visible and is able to be inspected, said servo-system comprising third means for sensing when the pressure of said air of said second means is out of the tolerance limits, fourth means responsive to said third means for changing the spacing between said objective lens and said film, fifth means responsive to said fourth means for preventing said shutter from opening and exposing said film while said fourth means is changing the spacing between said objective lens and said film, and sixth means responsive to said shutter for preventing said fourth means from changing the spacing between said objective lens and said film when said shutter is open.

8. A reducing camera comprising: a bed; first means for supporting an original record on said bed; a first optical reducing system having a light source of a first wavelength band and an objective lens mounted on said bed for producing a light beam along an optical axis to project a reduced image of said original record at a focal plane; a transparent photochromic film disposed at said focal plane; a film support assembly mounted on said bed for supporting said photochromic film at said focal plane and for moving said film in two orthogonal directions, said support assembly including a movable support for supporting said film perpendicular to said optical axis, first guide means disposed on opposite sides of and slidably engaging said movable support for providing motion to said movable support along one of said orthogonal directions with respect to said bed, second guide means disposed on opposite sides of and slidably engaging said first guide means for providing motion to said movable support along the other of said orthogonal directions with respect to said bed, and ball bearing means disposed between said movable support and said first guide means and between said first guide means and said second guide means for providing rolling contact therebetween; second means mounted on said objective lens for jetting a stream of air at a steady rate at said photochromic film and for forming an air pressure in the supply means of said air which pressure is inversely related to spacing between said objective lens and said photochromic film; a servo-system responsive to the pressure of said air of said second means for moving said objective lens with respect to said photochromic film to maintain a substantially constant spacing between said objective lens and said film, said constant spacing being chosen of a length such that a properly focused reduced image is formed on said film; a second optical reducing system having a light source of a second wavelength band mounted on said bed for projecting a light spot onto said film to permit inspection thereof and to permit erasure of said reduced image thereon; and inspection means for intercepting the light of said second wavelength band transmitted through said film by said reduced image, whereby the image formed on said film is visible and is able to be inspected.

9. A reducing camera comprising: a bed; first means for supporting an original record on said bed; a first optical reducing system having a light source and an objective lens mounted on said bed for producing a light beam along an optical axis to project a reduced image of said original record at a focal plane; a transparent light sensitive film disposed at said focal plane; a support assembly mounted on said bed for supporting said film at said focal plane and for moving said film in two orthogonal directions, said support assembly including a movable support for supporting said film perpendicular to said optical axis, first guide means disposed on opposite sides of and slidably engaging said movable support for providing motion to said movable support along one of said orthogonal directions with respect to said bed, second guide means disposed on opposite sides of and slidably engaging said first guide means for providing motion to said movable support along the other of said orthogonal directions with respect to said bed, and ball bearing means disposed between said movable support and said first guide means and between said first guide means and said second guide means for providing rolling contact therebetween; said objective lens being disposed to move relative to said film in a direction along said optical axis; air gauge means mounted on said objective lens for jetting a stream of air at a steady rate at said film and for forming an air pressure in the supply means of said air which pressure is inversely related to the spacing between said objective lens and said film; a servo-system means responsive to the pressure of said air gauge means to maintain a substantially constant spacing between said objective lens and said film, said constant spacing being chosen of a length such that a properly focused reduced image of said original record is formed on said film; and logic circuit means for determining when the spacing between said objective lens and said film is of such a length to produce a blurred image of said original record and to prevent exposure of said film while a blurred image is formed.

10. A reducing camera comprising: a bed; first means for supporting an original record on said bed; a first optical reducing system having a light source of a first wavelength band mounted on said bed for producing a light beam along an optical axis and having an objective lens for forming a reduced image of said original record at a focal plane; a light sensitive photochromic film disposed at said focal plane and coated on a flat, rigid, transparent plate; a film support assembly mounted on said bed for supporting said flat plate with said film disposed normal to said optical axis, said support assembly including a movable support to which said plate is fixed, and means for moving said flat plate in a direction normal to said optical axis while maintaining said film normal to said optical axis; said objective lens being disposed to move relative to said film in a direction along said optical axis; air gauge means mounted on said objective lens for jetting a stream of air at a steady rate at said film and for forming an air pressure in the supply means of said air which pressure is inversely related to the spacing between said objective lens and said film; a servo-system means responsive to the pressure of said air of said air gauge means for moving said objective lens with respect to said photochromic film to maintain a substantially constant spacing between said objective lens and said film, said constant spacing being chosen of a length such that a properly focused reduced image of said original record is formed on said film; logic circuit means for determining when said servo-system is moving said objective lens to prevent exposure of said film while said objective lens is being moved; a second optical reducing system having a light source of a second wavelength band mounted on said bed for projecting a light spot onto said film whereby the light from said light spot is transmitted through said reduced image formed thereon; and inspection means for intercepting the light of said second band transmitted through said film by said reduced image, whereby the image formed on said film is visible and is able to be inspected.

11. A reducing camera comprising: a bed; first means for supporting an original record on said bed; an optical reducing system mounted on said bed for forming a reduced image of said original record at a focal plane; and a light sensitive film disposed at said focal plane; said optical reducing system comprising a light source, a spherical mirror for reflecting the light from said light source along an optical axis and for forming an image of said light source spaced laterally therefrom, normal to said optical axis, to simulate a double light source, a first collecting lens for collecting light from said double light source and forming a substantially collimated beam of light, a first apertured stop-mask disposed in the way of said collimated beam of light, a first condenser lens for collecting the portion of said collimated beam of light passing through said first apertured stop-mask and for forming an image of said double light source on said optical axis, a second apertured stop-mask disposed coinciding with said image of said double light source for masking a portion of said double light source, and a lens means disposed adjacent said second apertured stop-mask for focusing an image of said first apertured stop-mask on said original record for illuminating a portion of said original record that is to be exposed on said light sensitive film.

12. A reducing camera comprising: a bed; first means for supporting an original record on said bed; a first optical reducing system having a light source mounted on said bed for producing a light beam along an optical axis and having an objective lens for forming a reduced image of said original record at a focal plane; a light sensitive film disposed at said focal plane; and a film support assembly mounted on said bed for supporting said film at said focal plane and for moving said film in two orthogonal directions, said support assembly including an inner movable support for supporting said film perpendicular to said optical axis, a pair of rods disposed on opposite sides of and slidably engaging said movable support, first ball bearings disposed between said rods and said movable support for providing substantially frictionless motion therebetween, a pair of track-riders to which said pair of rods are mounted, a pair of tracks slidably engaging said pair of track-riders, second ball bearings disposed between each of said track-riders and the respective one of said tracks slidably engaged therewith for providing substantially frictionless motion therebetween, and means for bearing said pair of track-riders against respective ones of said tracks to take up any play and wear that may be formed therebetween.

13. A reducing camera for forming a plurality of micro-images on a photochromic film, said camera comprising: means for supporting at least one original record; means for supporting said photochromic film within a plane and for moving said film within said plane in two directions at right angles to each other; a first optical system having a light source of a first wavelength band and an objective lens for projecting and forming one micro-image at a time of said original record on said film; a second optical reducing system having a light source of a second wavelength band for projecting a light spot towards said first optical system and onto said film to permit inspection thereof; and inspection means for intercepting the light of said second wavelength band transmitted through said film, whereby the micro-image formed on said film is visible and is able to be inspected.

14. The reducing camera of claim 13 wherein: said inspection means is disposed to intercept the light of said second wavelength band after the light passes through said objective lens.

15. The reducing camera of claim 13 wherein: said light source in said second optical system includes a means for increasing the intensity of the light of said second wavelength band in order to erase at least one of the micro-images formed on said photochromic film.

References Cited by the Examiner

UNITED STATES PATENTS 3,081,682  3/1963  Khoury.
3,122,075  2/1964  Klyce et al. _____ 95—4.5

FOREIGN PATENTS 685,573  11/1939  Germany.

NORTON ANSHER, *Primary Examiner.*

RICHARD A. WINTERCORN, *Assistant Examiner.*